United States Patent [19]

Bowles

[11] 4,217,885

[45] Aug. 19, 1980

[54] SOLAR HEAT COLLECTION

[75] Inventor: Vernon O. Bowles, Naples, Fla.

[73] Assignee: Solartrap, Inc., Naples, Fla.

[21] Appl. No.: 897,402

[22] Filed: Apr. 18, 1978

Related U.S. Application Data

[63] Continuation-in-part of Ser. No. 676,156, Apr. 12, 1976.

[51] Int. Cl.² ............................................. F24J 3/02
[52] U.S. Cl. ............................ 126/444; 126/447; 126/450; 126/426
[58] Field of Search ............... 126/450, 432, 434, 426, 126/449, 450, 425

[56] References Cited

U.S. PATENT DOCUMENTS

| | | | |
|---|---|---|---|
| 1,250,260 | 12/1917 | Wilcox | 126/435 |
| 3,022,781 | 2/1962 | Andrassy | 126/426 |
| 4,038,967 | 8/1977 | Stout | 126/426 |
| 4,063,547 | 12/1977 | Gruettner | 126/432 |
| 4,096,861 | 6/1978 | Bowles | 126/444 |
| 4,116,220 | 9/1978 | Burd | 126/449 |
| 4,143,644 | 3/1979 | Heitland et al. | 126/444 |

*Primary Examiner*—James C. Yeung
*Attorney, Agent, or Firm*—Albert C. Johnston

[57] ABSTRACT

The heat of solar radiation is collected through a thin receptor panel directly into liquid held against and flowable upwardly along the panel in shallow channels extending between upper and lower plenum spaces in a receptor chamber which is inclined across the path of the sunlight and connected in a flow circuit kept completely filled with the liquid under a limited constant hydrostatic pressure. The flow circuit extends from the upper plenum space to a heat exchange zone and then back into the lower plenum space. The receptor chamber is formed by two flexible plastic panels which are sealed together peripherially and also along closely spaced longitudinal seams to provide the channels and plenum spaces. The panel seams limit the depth of bulging of the channels and plenum spaces by the pressure of the liquid, and bulging is further constrained and distortion of the receptor prevented by means along the opposite side edges of the chamber which hold the receptor under cross tension counteracting the hydraulic pressure. The volume of liquid filling the receptor is so small in relation to the surface area exposed to radiation that little sun time is lost in bringing the system to a relatively high temperature for delivery of the collected heat.

11 Claims, 9 Drawing Figures

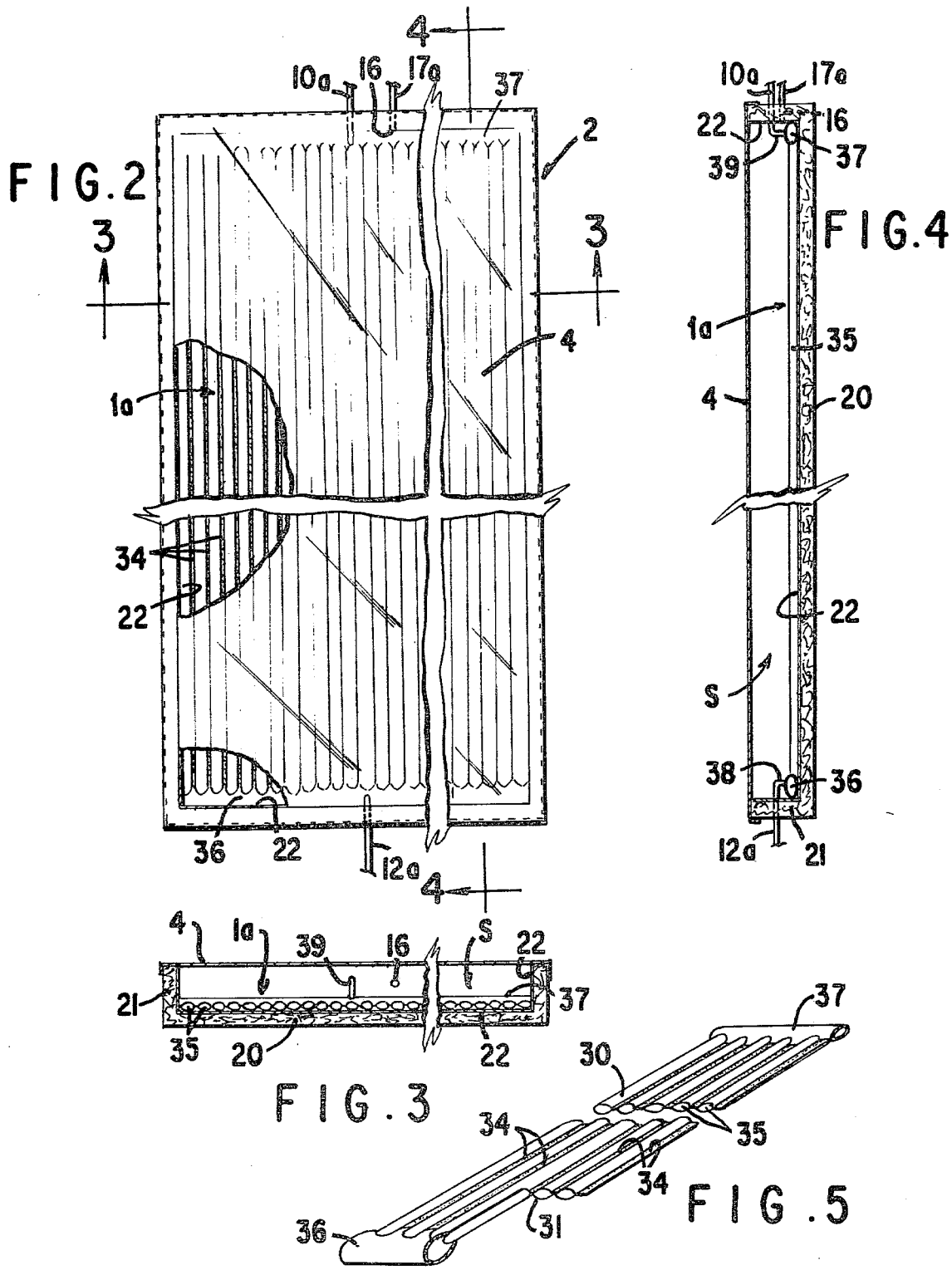

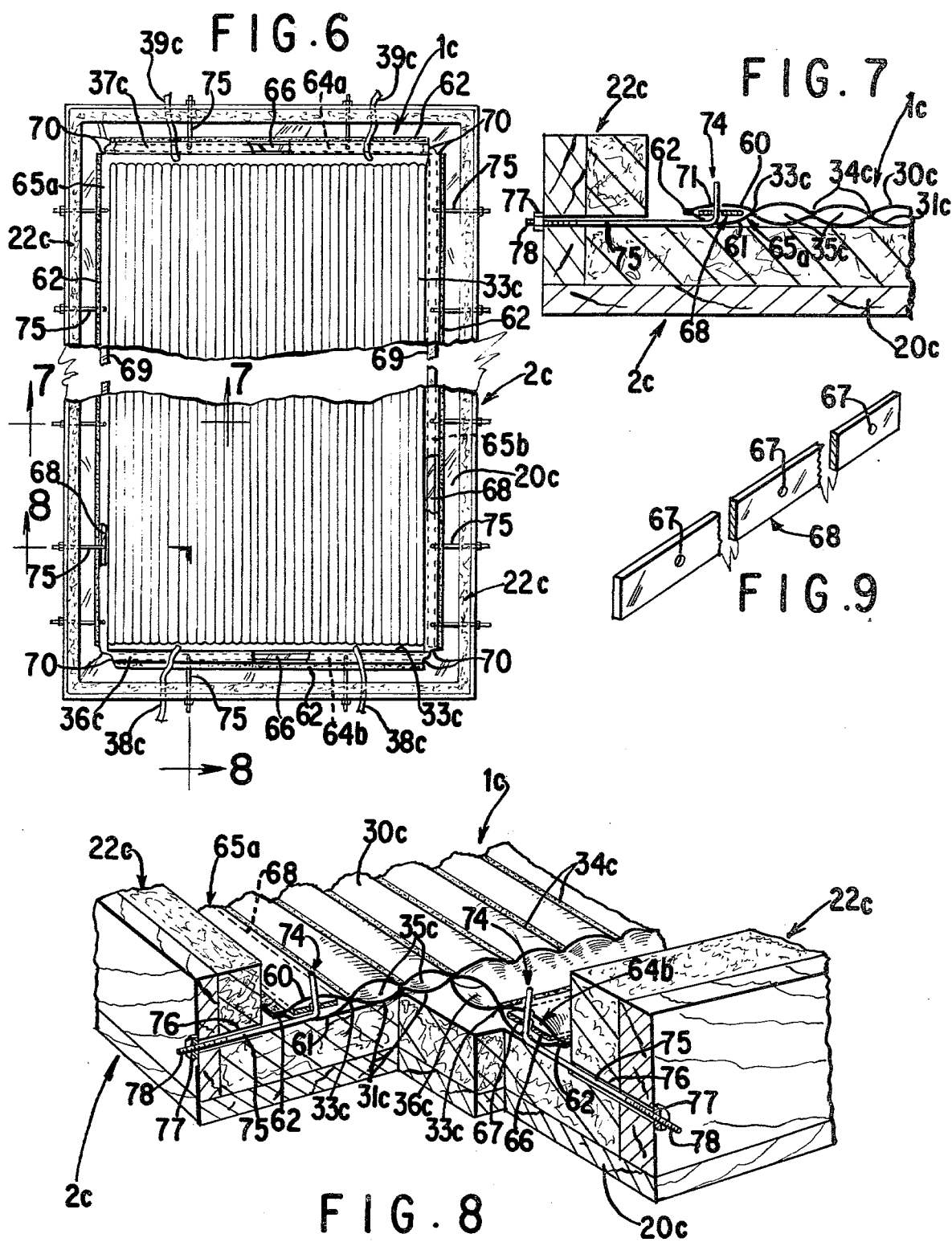

SOLAR HEAT COLLECTION

This is a continuation-in-part of copending application Ser. No. 676,156 filed Apr. 12, 1976.

This invention relates to means for collecting heat from sunlight and, more particularly, to an apparatus of relatively simple and economical construction and operation by which the heat of solar radiation is collected in liquid at a high thermal efficiency and in a manner enabling a relatively high heat delivery temperature.

Many and various forms and kinds of apparatus and processes have been proposed for collecting solar heat in order to render it usable either directly or as a supplement to fuel energy for water heating or space heating needs. Many of the known proposals would provide radiation-receptive panels inclined across the path of the sunlight, together with means for collecting heat absorbed by the panels, or radiation passed through them, in a liquid carrying the heat away for utilization. Among the proposals generally of this description are those set forth in U.S. Pat. Nos. 2,469,496, 2,575,478, 2,954,232, 3,107,052, 3,194,228, 3,215,134, 3,236,294, 3,270,739, 3,513,828 and 3,918,430.

Those known proposals are not known to have attained any very extensive practical use or commercial success. Generally speaking, they involve important deficiencies in regard to the complexity and costs of construction and installation of the apparatus or the efficiency of the solar heat collection or the temperature level maintainable for delivery of the collected heat.

The principal object of the present invention is to provide an apparatus for collecting solar heat which will overcome or at least significantly alleviate those deficiencies, enabling installations for the collection and utilization of solar energy to be made and used economically at an expense outweighed by the value of the heat they will deliver usably.

Another object of the invention is to provide an apparatus by which solar heat is collected in a liquid carrier at a high thermal efficiency, and by which the liquid can be promptly brought to and delivered at a relatively highly elevated temperature when desired for efficient utilization of the heat.

Another object is to provide an apparatus making use of a solar radiation receptor having a simple and inexpensive chamber structure that is kept completely filled with liquid, in a manner enabling efficient collection of the heat yet with the receptor structure constantly safeguarded against distortion or rupture by hydrostatic pressure.

The apparatus of the present invention comprises as its basic element a substantially planar shallow liquid containing radiation receptor that is adapted to be placed in a heat insulating support at an inclination across the path of sunlight and kept completely filled with liquid for directly collecting the incident solar heat, yet is suited for a relatively inexpensive, modular manner of construction. This receptor comprises a thin front panel exposed to the radiation, a back panel and means interconnecting the two panels peripherally and in and along laterally spaced longitudinal regions thereof so as to define between them a shallow fluid-tight chamber subdivided into a multiplicity of long shallow channels which confine the liquid filling them to a thin layer and extend from a common plenum space in lower end of the chamber to a common plenum space in its upper end. The lower plenum space is provided with an inlet for liquid flow thereinto, and the upper plenum space with an outlet for outflow of heated liquid. These flow passages are coupled with conduit means for conducting liquid in a circuit from the outlet to a heat exchange zone and thence back into the inlet, which circuit as well as the receptor chamber is kept completely filled with liquid, and means are provided for holding the liquid filling the circuit constantly under only a slightly elevated pressure that will not rupture the receptor chamber.

An installation of the apparatus may comprise as the radiation receptor a single receptor unit or a plurality of similar units, depending upon the exposed surface area of each unit and the amount of heat required from the installation. Plural receptor units may be made readily to a modular form suitable for easy installation. Each receptor unit, or module, may be made, for instance, with a width of about 2 to 4 feet and a length of about 6 to 8 feet, thus providing about 15 to 30 square feet of receptive front panel surface exposed to the sunlight. When there are two or more receptor units in an installation, as typically will be the case for space heating, their respective liquid inlets and liquid outlets are connected in parallel with the conduit means of the liquid flow circuit.

The front panel of the receptor advantageously is a clear thin wall composed of a strong plastic pervious to solar heat radiation, the liquid held beneath it then being a black or opaque liquid absorptive to the radiation and containing an antifreeze if needed. Such a liquid may be provided, for example, as an aqueous solution or suspension of the absorptive substance, which may be, for example, a fine carbon black or lampblack or a colloidal substance such as mercury sulfide, ferric hydroxide or colloidal gold. Alternatively, the front panel or both of the receptor panels may be opaque or black, as by being composed of a pigmented or coated strong plastic sheet material, so that the heat radiation of the sunlight will be absorbed in the panel structure of the receptor and transferred directly from it to the liquid layer held constantly in contact with it. In the latter case, the liquid filling the flow circuit may be an aqueous antifreeze solution, or water if the climate permits, or any other suitably heatable and flowable liquid that will not deteriorate objectionably or cause objectionable sedimentation in the system.

The receptor may be constituted by suitably interconnected sheets of a strong flexible plastic sheet material, such, for example, as a polyvinyl chloride sheeting about 0.004 to 0.04 inch thick or an equivalent sheeting of polypropylene or polyethylene. Such sheets can be disposed one over the other and sealed together peripherally and along laterally spaced longitudinal regions thereof, as by heat-sealed seams or by a suitable adhesive, so as to define between them a shallow fluid-tight chamber subdivided into the channels and plenum spaces. When the seams are continuous, the channels are laterally separate from each other. Thus, the receptor can be made somewhat in the manner of an air mattress, resulting in a non-rigid or pliable liquid confining chamber structure that will readily withstand the limited hydrostatic pressure to which it is subjected and the thermal stresses produced by atmospheric and solar temperature changes.

The longitudinal seams subdividing the receptor chamber constrain its front and back panels against bulging too far apart or rupturing under the limited pressure of the liquid filling the chamber and confine the liquid in the chamber channels to a shallow layer which at all events is of less than one inch and preferably does not exceed about one-half inch in average depth. They limit the width of the channels so that liquid being heated in the channels will not distort them and will flow upwardly in them by thermal gravity effects. They may also keep each channel separate from the others so that the liquid heated in one channel will not diffuse laterally into other channels.

The receptor chamber thus is not merely provided with the required structural integrity; it also keeps a relatively small volume of liquid filling it distributed over relatively a very large radiation receptive area so that the liquid in each channel can be heated efficiently by the solar heat which it receives directly through or from the front panel contacting it, and the upflow of the liquid heated in the channels can result in the collection of hotter liquid in the upper plenum space, with the development of a substantially uniform elevated temperature there at a level which is controllable simply by regulation of the rate of heat removal from the liquid in its flow circuit.

According to a further feature of the invention, it has been found beneficial to provide the receptor made of flexible plastic sheet material with constraining means which engage with edge portions of the panels along the opposite side edges of the receptor chamber and hold the receptor under cross tension counteracting the hydraulic pressure in the chamber. In this way, the liquid filling the channels and the plenum spaces is prevented from bulging them to the extent otherwise permitted by the panel seams. An advantageous form of such constraining means comprises bars disposed in pockets formed by edge portions of the panels and pin elements secured to the receptor supporting structure for engaging the bars and holding them spaced apart so that they exert stretching forces counteracting the hydraulic pressure. By virtue of such constraining means, the receptor is held to the desired shape without being wrinkled or distorted objectionably by the differences of hydraulic pressure which exist between the lower and upper ends of the liquid-filled chamber, and the channels and plenum spaces are held to a shallow ovaloid form that enhances the spread of the liquid and enables filling of the receptor by a minimal quantity of liquid—for instance, by as little as about 0.75 to 1 pint of liquid per square foot of the front surface area exposed to solar radiation.

The temperature of the solar heated liquid flowing into the upper plenum space can rise up to a limit principally determined by the solar heat intake and the heat losses of the receptor. The temperature at which the heated liquid will be delivered from the receptor depends upon these heat factors, the rate of liquid flow through the system and the temperature of the liquid being returned into the lower plenum space, this temperature being dependent upon the amount of heat taken out of the liquid as it passes through the conduit means and the heat exchange zone of the flow circuit.

For uses of the invention to collect and deliver solar heat at a relatively low temperature level, a relatively high volume of heat collecting liquid can be employed in the circuit, as by circulating liquid under low pressure through the receptor from and back into a pool or other relatively cool reservoir, or from and back through a heat exchanger in the flow circuit. It is also feasible to arrange the apparatus for thermal-gravity circulation of the heat collecting liquid, in which case a heat exchanger elevated in the flow circuit with a leg of the conduit means extending from the heat exchanger outlet to the foot of the receptor are so located as to induce the required circulation of liquid.

In order to utilize the collected solar heat efficiently at a relatively high temperature, which is important for domestic water or space heating needs, the flow circuit of the apparatus includes a heat exchanger in which heat from the liquid outflow of the receptor is transferred to another fluid, and the entire receptor system is made with a limited liquid containing capacity, for instance to contain in total less than 1¼ quarts of liquid per square foot of receptor surface exposed to the sunlight, so that relatively little sunlight time is required for bringing the system up to the temperature desired for the heat transfer to the other fluid, e.g., into the range of about 120° to 170° F.

For uses of this nature, the apparatus generally includes a pump for circulating the heat collecting liquid in the circuit through the heat exchanger, means for sensing the temperature of the liquid in the upper plenum space of the receptor, and means activated by this sensor for operating the pump when that temperature exceeds a predetermined level. Thus, a minimum temperature level is preset for delivery of the collected solar heat from the receptor. Further, in order to assure that the entire circuit will be at the desired elevated temperature when the collected heat is being transferred to the other fluid, a second temperature sensor is provided in the flow circuit of the receptor and connected with means whereby a pump or a valve for flowing the other fluid through the heat exchanger will be operated when the temperature of the liquid being circulated through the receptor circuit exceeds a second predetermined level higher than the minimum level above mentioned. The second level is to be kept about 5° to 50° F. higher than said minimum level. A combination of this kind is particularly useful where the other fluid is a second liquid that is to be heated to a considerably elevated temperature for storage in and use from a tank—whether as domestic hot water or as a medium for further heat transfer through a spacer heater. Particulars of systems utilizing such a combination are set forth in the aforesaid copending application, the disclosures of which are incorporated herein by reference.

The above mentioned objects, features and advantages of the invention will be further apparent, and others will also be evident, from the following detailed description and the accompanying drawings of illustrative embodiments of the invention. In the drawings:

FIG. 2 is a plan view of a receptor module comprising a solar radiation receptor, or heat collector, in a supporting enclosure;

FIG. 3 is a transverse cross-sectional view taken along line 3—3 of FIG. 2;

FIG. 4 is a longitudinal cross-sectional view taken along line 4—4 of FIG. 2;

FIG. 5 is an enlarged perspective view, partly in section, of a portion of the receptor structure of FIGS. 2–4;

FIG. 6 is a plan view of a receptor module embodying a further development of a radiation receptor of the type illustrated in FIG. 2;

FIG. 7 is a cross-sectional view taken along line 7—7 of FIG. 6;

FIG. 8 is a cross-sectional view taken along angled line 8—8 of FIG. 6;

FIG. 9 is a perspective view, partly broken away, of one of the bars containing the receptor of FIG. 6.

Figure 1:
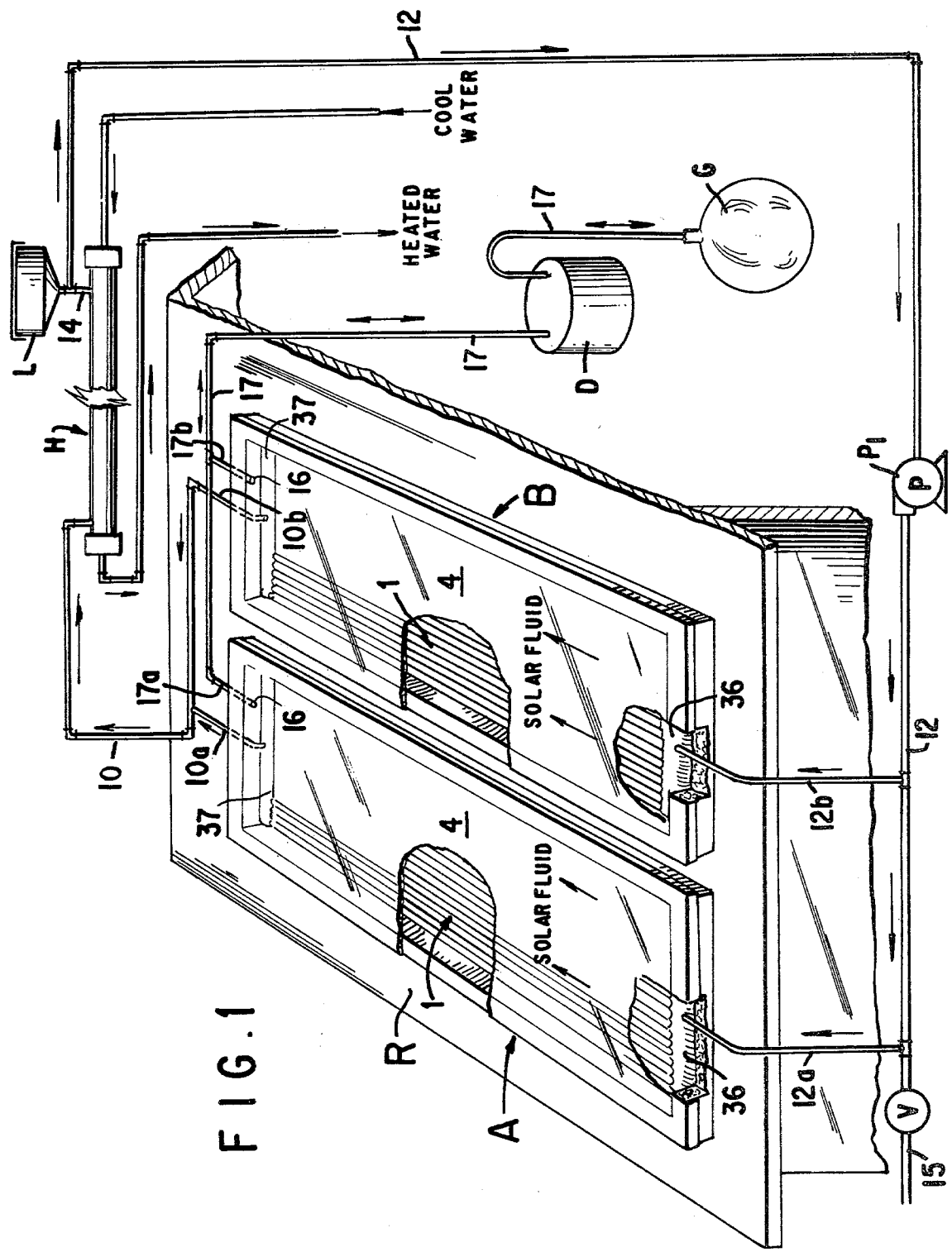
FIG. 1 is a schematic view of a solar heating installation embodying the invention.

The installation shown schematically in FIG. 1 comprises two similar solar receptor modules A and B which are located on a sloping roof R having a generally southern exposure so that the front surface of the radiation receptor, or heat collector, of each module lies across the path of the sunlight. More than two of the modules, or one only, may of course be provided. Each module corresponds generally to the structure shown in FIG. 2 or FIG. 5 and comprises a solar radiation receptor 1 which is shielded from ambient atmospheric conditions by being placed in a heat insulating tray-like support 2 and being closed off so as to exclude moisture and ambient air currents by means including a transparent cover sheet 4 spaced over the receptor.

The receptors 1 are connected in parallel in a liquid flow circuit arranged beneath the roof. The flow circuit includes a conduit 10 having branches 10a and 10b passed through the roof for conducting heated liquid from the upper ends of the receptors 1 into a heat exchanger H and a conduit 12 for conducting the heat collecting liquid from the heat exchanger back into the lower ends of the receptors through roof branches 12a and 12b. A low pressure circulating pump P1 is connected in conduit 12 for flowing the liquid in the circuit upwardly through the receptors and thence through the flow circuit.

A pressure limiting expansion chamber L (FIG. 1) holds a quantity of liquid at an elevation only a short distance, e.g., about 1 to 3 feet, above the highest point in the receptor liquid flow circuit, and in communication through a standpipe 14 with the liquid filling the circuit. The liquid level in chamber L keeps the liquid in the receptors 1 under a limited hydrostatic head, producing a little-elevated pressure which is insufficient to rupture the receptor chamber. This pressure at the lowest location in the receptor will usually amount to less than five (5) pounds per square inch. The chamber L, being vented to the atmosphere, also accommodates the necessary expansion and contraction of the liquid filling the system and enables vapors to escape from the system.

It will be understood that other arrangements of the pressure limiting chamber may be used; for instance, a surge chamber may be provided at a lower elevation for holding a quantity of liquid in communication with the liquid filling the flow circuit so as to keep it under a limited elevated pressure maintained mechanically.

The initial filling of the system with the heat collecting liquid may be effected through the elevated surge chamber L. The filling may also be effected by flowing the liquid under low pressure into the system through a valved connection 15 leading into the lowest part of the conduit 12. In this way, the air and vapors in the system may be forced out readily through the chamber L as the liquid filling level rises through the system.

FIGS. 2-5 illustrate a receptor module containing an effective form of a radiation receptor according to the invention. This module comprises a tray-like rectangular heat insulating support 2 made with dimensions, preferably, of about 3 to 4 feet in width and 6 to 8 feet in length, thus enabling the enclosed receptor 1a, which is slightly smaller in area, to present about 15 to 30 square feet of front panel surface exposed to the sunlight. The receptor 1a is laid flat into the heat insulating support 2. The support is formed of an insulating foamed plastic composition, e.g., polystyrene foam, and comprises a base or back wall 20 and an upstanding side wall 21 enclosing the peripheral edge of the receptor. The inner surface of these walls preferably is covered by a heat-reflective foil layer 22, such as aluminum foil, to aid in limiting heat losses by radiation from the receptor.

A transparent cover sheet 4 in this embodiment is supported on and adhered in substantially gas-tight relation to the top of the side wall 21, thus closing off the receptor from ambient moisture and air currents and forming a substantially gas-tight cover space S of about 1 to 2 inches in depth between the cover sheet and the front of the receptor. The cover sheet 4 may be a sheet of window glass or plate glass. Preferably, however, it is a relatively stiff sheet of a strong clear plastic sheet material, such as a clear sheet of polystyrene or an acrylic resin (e.g., "Plexiglas").

The receptor 1a comprises a front panel 30 and a back panel 31, each formed by a thin sheet of a strong flexible plastic sheet material, such, for example, as clear polyvinyl chloride sheeting about 0.016 inch thick. The panels are joined together about their peripheral edges, as by a heat sealed seam or a strong adhesive, thus forming them into a liquid-tight chamber. The panels are also joined together, similarly, by a multiplicity of seams 34 which extend longitudinally thereof and are spaced apart laterally so as to confine the receptor chamber to a shallow substantially planar form subdivided into a multiplicity of laterally separate long shallow channels 35 extending from a common plenum space 36 across their lower ends to a common plenum space 37 across their upper ends.

The channels 35 in this embodiment are each limited in width, desirably being made about one (1) inch or less wide between the bounding seams, so that in the use of the receptor, its chamber then being completely filled with liquid under a limited pressure, the liquid layer in each channel even under heating conditions will continue to have a substantially constantly limited depth, which preferably averages to not more than about $\frac{1}{4}$ to $\frac{1}{2}$ inch. In short, the panel interconnecting structures which subdivide the chamber confine the liquid layer filling the chamber so that as the liquid in the channels is being heated it will not distort the chamber, and will flow in them only upwardly by thermal-gravity effects. The chamber structure thus induces an upwardly increasing temperature gradient in each channel, causing the hottest liquid in the receptor to collect in the upper plenum space 37 for delivery from it through the liquid flow circuit for exchange of the collected solar heat.

An inlet 38 opening into the lower plenum space 36 is provided for the flow of heat collecting liquid from conduit branch 12a (or 12b) into the receptor chamber, and an outlet 39 opens from the top of the upper plenum space 37 for the outflow of heated liquid into conduit branch 10a (or 10b). Each of these flow connections may be formed, for example, by a piece of PVC tubing sealed into an opening in the front wall of the related plenum space. The tubing pieces or portions of the respective conduit branches connected with them are passed through and sealed in respective openings in the side wall 21 at the upper and lower ends of the heat insulating receptor support 2, where branch connections join each receptor 1a into the flow circuit of the heat collecting liquid, for instance as indicated in FIG. 1.

In preferred practices of the invention, the front panel 30 of the receptor 1a is a clear or at least translucent wall pervious to solar heat radiation, and the liquid filling the receptor is an aqueous solution or suspension of a substance absorptive to the radiation, such, for example, as a black liquid formed by mixing a small proportion of lampblack paste or colloidal graphite with water or an antifreeze solution. Although in principle somewhat less efficient, it is also effective to form the receptor with an opaque or black front panel 30 absorptive to the radiation, e.g., a panel of a plastic sheet material pigmented or painted dull black, and to use clear water or an antifreeze or antifreeze solution, or any other desired liquid, as the heat collecting liquid. This alternative is effective because of the constant direct contact and direct heat wiping action of the shallow layer of liquid held against the front panel which receives the radiation.

As indicated in FIGS. 1 and 2, a breathing port 16, or vent, is provided for the cover space S inside the closure of each receptor, i.e., the space between the front of the receptor and its transparent cover sheet 4. A tube from this port extends through the side wall 21 of the support 2 and is connected with a gas impervious surge chamber G through a roof branch 17a or 17b of a conduit 17. The surge chamber G may be, for instance, a partially filled collapsible baloon. It contains a quantity of the air or other gaseous atmosphere of the cover space and is expansible and self-contractible in response to variations of the volume and pressure of the air or other radiation permeable gas in the cover space. Consequently, that air or other gas, while being kept isolated from the moisture and currents of the ambient atmosphere, will flow out and back in periodically as the gas volume in the cover space is varied by diurnal and cloud-induced temperature changes, thus preventing objectionable deflections or stresses of the cover sheet by pressure changes and limiting the tendency to draw moist ambient air into the cover space.

The gas in the cover space ordinarily will contain moisture, either initially or, in time, as a result of diffusion of seepage of moisture thereinto. The temperature-induced flow of air or other gas back and forth between the cover space S and the surge chamber G can be utilized for removing any objectionable moisture by conducting this flow through a closed container D connected in conduit 17 as a part thereof and holding a dessicant in contact with the gas flow. In this way, the atmosphere in the cover space can be kept so low in moisture content that condensation or fogging on the underside of the cover sheet, which would seriously obstruct its transmission of solar heat radiation, will be prevented at all times.

FIGS. 6–9 illustrate a receptor module of the type already described but which embodies an improved form of construction and assembly of a radiation receptor according to the invention. In this embodiment, the receptor 1c comprises a liquid-tight shallow chamber structure formed by front and back panels 30c and 31c of flexible plastic sheet material, such, for example, as clear polyvinyl chloride sheeting about 12 mils (0.012") thick, which are formed to dimensions, for example, of about 36" by 84" and are joined and sealed together peripherally and also along close, laterally spaced longitudinal regions of the chamber by heat-sealed seams 33c and 34c. The seams 34c are spaced from the peripheral seam 33c and mutually spaced apart by a small distance, for instance of about 1 inch. They subdivide the chamber into a multiplicity of laterally separate shallow channels 35c extending from a common plenum space 36 across their lower ends to a common plenum space 37c across their upper ends.

An inlet for the flow of heat collecting liquid is provided by two tubes 38c, for instance pieces of PVC tubing, which open through and are each sealed in the front panel 30c. Two similar tubes 39c sealed in an upper portion of the front panel constitute an outlet from the upper plenum space 37c for the flow of heated liquid from the receptor chamber into a liquid flow circuit of the type illustrated in FIG. 1. Thus, the outlet tubes 39c lead into a conduit such as conduit 10 of the flow circuit, and the inlet tubes 38c lead into the receptor chamber as branches from a conduit such as conduit 12 of the flow circuit. As previously described in reference to FIG. 1, a plurality of receptors similar to receptor 1c may be connected in parallel with the conduits 10 and 12 as parts of the same liquid flow circuit.

Liquid suitably heated by the solar radiation is conducted from the receptor or receptors to a heat exchange zone, which typically is the shell side of a heat exchanger, and thence back into the lower plenum space of each receptor. The liquid preferably is circulated by a low-pressure circulating pump as previously described. As also described previously, the receptor(s) and the conduits of the flow circuit are kept completely filled with liquid under a low hydrostatic pressure by a pressure-limiting liquid expansion chamber, which may correspond to chamber L of FIG. 1. Such a chamber, although to be located at an elevation slightly higher than the upper end of the receptor, may be connected to any part of the flow circuit conduits.

The panels 30c and 31c which form the receptor 1c have edge portions 60 and 61 which extend laterally beyond the peripheral seam 33c that borders the receptor chamber and are provided with positioning means to be engaged and held apart by constraining elements on a receptor support structure 2c so as to hold the receptor under cross tension counteracting the hydraulic pressure in the receptor chamber. According to a preferred embodiment of the invention, the edge portions 60 and 61 are joined together along their outer edges, for instance by a heat-sealed seam 62, at a suitable distance from each side edge of the receptor to form pockets 64a and 64b along its upper and lower end edges and pockets 65a and 65b along its lateral edges. The pockets are made wide enough to receive rigid positioning bars, or battens, which they confine in place along the side edges of the receptor chamber. The end edge battens may be, for instance, steel bars 66 about 36 inches long having cross sectional dimensions of about ½" by ¼", each formed with two small openings 67 at locations about 9 inches from each end. The lateral edge battens may comprise along each longer side of the receptor lower and upper steel bars 68 and 69 similar to the bars 66 in cross section, having lengths, for instance, of about 42 inches. Each of the bars 68 and 69 is also formed with two or more small openings 67 through it for engagement with receptor constraining elements as described below. FIG. 9 illustrates a bar 68 having three such openings 67.

As shown in FIG. 6, corner portions of the receptor panels may be cut away to provide openings 70 at the ends of the pockets, so that the bars 66, 68 and 69 may be assembled with the receptor simply by being slide into the respective pockets through such end openings. Also, the panel edge portions forming the poclets are formed with small openings 71 in register with the openings 67 formed in the bars, to admit receptor constraining elements engaged with the bars.

The receptor 1c provided with the described positioning means is arranged for use by being laid flat into a suitable support structure 2c which may be a heat insulating enclosure that supports the receptor and shields it from ambient atmospheric conditions in the manner described in reference to the embodiment of FIG. 1. The enclosure includes a rigid frame lined with heat insulating material and forming a base wall 20c and a peripheral side wall 22c. The side wall is overlaid by a transparent cover sheet, for instance, as described regarding FIG. 1. The receptor laid on the base wall 30c is constrained in place by elements 74 which engage and hold apart the positioning means along opposite side edges of the receptor chamber. The constraining elements 74 desirably have the form of pins which engage with bars 66, 68 and 69 by being passed through the small bar openings 67 and pocket openings 71. The pins 74 are positioned so that when the receptor is readied for use by being connected into its flow circuit and filled with liquid they will exert through the bars forces urging the opposite side edges of the receptor chamber away from each other, thus holding the receptor panels under a cross tension counteracting the hyraulic pressure in the receptor chamber.

To faciliate proper tensioning of the receptor, the pins 74 desirably are provided as vertically protruding end portions, preferably sloped or hooked somewhat away from the receptor chamber, of rods 74 which extend through holes 76 formed in the side wall 22c of the enclosure 2c and have means thereon at the outer side of the enclosure for setting the positions of the rods and thus of the pins 74 and the bars 66, 68 and 69. The positions of the rods 75 may be suitably adjusted and set, for instance, simply by turning nuts 77 screwed onto threaded end portions 78 of the rods. The settings of the pins 74 desirably are effected, for instance, so that when the liquid in the receptor is under a typical hydrostatic head of 2 to 4 feet a constraining force of about 10 to 20 pounds is exerted on the bar 66 at each end of the receptor, a force of about 20 to 40 pounds on each of the upper side bars 69, and a force of about 30 to 60 pounds on each of the lower side bars 68.

It has been found that the cross tension applied over the chamber area of the receptor effectively limits bulging of the channels 35c and the plenum spaces 36c and 37c so as to prevent distortion and wrinkling of the receptor under the pressure of liquid filling the receptor chamber. In this way, an important improvement is achieved in the efficiency of the collection and delivery of solar heat by the liquid in the channels, and especially so in the channels located near the lateral borders of the chamber.

Moreover, the flow channels are confined by the cross tension to a relatively shallow ellipsoidal form having in cross section a minor axis of less than half the length of its major axis, so that a very small volume of liquid will fill the receptor chamber. Thus, the chamber can be filled by less than only 1 pint of the heat collecting liquid per square foot of the front panel area exposed to solar radiation. The entire flow circuit of a system containing two of the receptors can be filled, for instance, by as little as 20 quarts or less of the liquid. As a result, under sunlight the liquid in the receptor more quickly attains and can be kept more efficiently at an elevated temperature suitable for the efficient transfer of heat in the heat exchanger of the flow circuits to another fluid for use as domestic hot water or for space heating.

In the operation of a solar heat collecting installation according to the invention, as the liquid filling the receptor 1 or 1c becomes heated by solar radiation received in or through the front panel of the receptor the heated liquid rises into the upper plenum space of the receptor, and when the temperature there reaches or exceeds the minimum set by a first temperature sensor the pump P1 is operated. The heated liquid then is circulated through the receptor flow circuit, bringing its conduits and the heat exchanger H nearly to the temperature level at the upper end of the receptor.

Due to the low ratio of liquid volume in the system to receptor surface area, which typically will amount to less than 1¼ quarts of liquid per square foot of exposed receptor surface, the temperature of the circulating receptor liquid under continuing sunlight increases relatively fast. Generally it will rise into the range of 120° to 180° F. if heat is not being transferred out of the heat exchanger. A second temperature sensor, however, is set to act at a temperature level desired for the heat delivery in the heat exchanger H, for instance at 130° F. When the temperature of the liquid in the receptor flow circuit reaches or exceeds this level, a second circulating pump is operated to flow domestic water through the tubes of the heat exchanger and thence into a storage tank at a rate suitable for heating the water nearly to the temperature level of the receptor liquid entering the heat exchanger.

It will be evident that the present invention provides a solar heating apparatus and system which are particularly advantageous in that:

(1) The heat of solar radiation is collected directly through a thin receptor panel into a shallow layer of liquid constantly held in direct contact with and flowable upwardly along the under side of this panel, which, being kept constantly under only a small pressure head, can readily be of 15 to 30 square feet, or larger, in radiation receptive surface area; so a solar heat collecting efficiency of 50 to 75% can be attained, giving about 3000 to 5000 BTU of deliverable heat per hour from each receptor under a clear high sun.

(2) As heat collects in the liquid layer of the receptor the heated liquid flows upwardly and will collect the heat in the upper end of the receptor; so any desired heat delivery temperature up to a maximum receptor temperature in the range of about 150° to 180° F. can be selected and reached quickly for utilization of the collected heat.

(3) By virtue of the collection of hotter liquid at the upper end of the receptor; plural receptor units, or modules, can be connected in parallel for assured delivery of the heat collected in them through a common liquid flow circuit at a desired elevated temperature, and the heating capability of an installation can readily be made larger or smaller according to the number of receptor modules utilized.

(4) The receptor liquid flow circuit can be limited readily to a low liquid inventory, amounting for instance to less than 1¼ quarts and preferably even less than 1¼ pints per square foot of exposed surface, with corresponding limitation of the heat losses and time involved in bringing the entire flow system to an elevated temperature desired for delivery of the collected heat; so high heat delivery temperatures, for instance of above 125° F. as desired for domestic water heating, can be reached promptly throughout the system and utilized for heat transfer by a continuing flow of the receptor liquid. Since not more than about 30 to 60 minutes of clear sun time will be needed for readying the system, an exceptionally large portion of the sunny periods of daytime is made usable for solar heating at a high temperature level.

(5) The radiation receptor, being subject to little hydrostatic pressure, can be fabricated from any of a variety of materials at low cost. Depending upon preferences and the availability of materials and equipment for its fabrication, the receptor can be made of clear flexible plastic sheeting for use with an opaque or black liquid absorptive to solar radiation, or of opaque or black radiation absorptive flexible plastic for use with water or any other desired liquid as the heat collecting medium.

(6) The receptor liquid flow is adaptable for a variety of heat delivery systems, including even thermal-gravity circulation of the liquid if desired. It is particularly suitable for being controlled so as to assure a desired elevated temperature level for the delivery of solar heat under the changing conditions which accompany changes of the sun position, variable degrees of haziness or cloudiness, and the diurnal cycle.

What is claimed is:

1. Apparatus for collecting solar heat comprising a substantially planar radiation receptor supported at an inclination across the path of sunlight, said receptor being composed essentially of a front panel of strong flexible plastic sheet material about 0.004 to 0.04 inch thick, a back panel of such material substantially coextensive with said front panel and means interconnecting and sealing together said panels entirely about their peripheries and also along laterally spaced longitudinal regions thereof so as to form said panels into and define between them a shallow fluid-tight chamber subdivided into a multiplicity of long shallow channels extending from a common plenum space in the lower end of the chamber to a common plenum space in its upper end, an inlet to said lower plenum space for liquid flow into said chamber, an outlet from said upper plenum space for outflow of heated liquid, said channels each being of not more than ½ inch in average depth and being sufficiently limited in width that liquid filling and being heated in said chamber will not distort said channels and will flow only upwardly in them under the influence of thermal-specific gravity gradients to bring hotter liquid preferentially into said upper plenum space, conduit means for conducting liquid in a circuit from said outlet to a heat exchange zone and thence back into said inlet, means for keeping said chamber and said conduit means completely filled with liquid and holding the liquid in said chamber constantly under a substantially uniform limited pressure insufficient to rupture said receptor, and means for continuously circulating the liquid in said circuit into and upwardly through and from said chamber under a constantly low pumping pressure.

2. Apparatus according to claim 1, said pressure holding means comprising an expansion chamber vented to the atmosphere and holding liquid in communication with but at an elevation only a short distance higher than the liquid in said circuit.

3. Apparatus according to claim 1, said pressure holding means comprising an expansion chamber closed to the atmosphere and containing liquid in communication with the liquid in said circuit and means for keeping the liquid in said expansion chamber constantly under a slighly elevated pressure less than 5 p.s.i. above atmospheric pressure.

4. Apparatus according to claim 1, said panels each being a unitary piece of thermoplastic sheet material, said pieces being disposed one over the other and heat-sealed together peripherally and along laterally spaced regions extending longitudinally between and spaced from the upper ends and the lower ends of said panels so as to define said channels and said plenum spaces.

5. Apparatus according to claim 1 and further comprising an enclosure supporting said receptor and shielding it from ambient atmospheric conditions, said enclosure including a heat insulating support having a base underlying and an upright side wall extending peripherally about said receptor and a transparent cover sheet supported on said side wall and extending over said receptor at a distance from said front panel, said support having receptor constraining elements secured hereto, said panels having positioning means on edge portions thereof along the opposite side edges of said chamber, said positioning means being engaged and held apart by said constraining elements and holding said receptor under cross tension counteracting the hydraulic pressure in said chamber so as to limit bulging of said channels and said plenum spaces.

6. Apparatus according to claim 5, said positioning means comprising bars disposed along said side edges in pockets formed by edge portions of said panels.

7. Apparatus according to claim 6, said constraining elements comprising pins engaged with said bars and exerting through said bars forces urging the opposite side edges of said chamber away from each other.

8. Apparatus according to claim 7, said pins being engaged in holes in said bars.

9. Apparatus according to claim 6, said constraining elements comprising pins engaged with said bars and exerting through said bars forces urging the opposite side edges of said chamber away from each other, said pins being end portions of rods extending through said side wall, said rods having means thereon outside said side wall for adjusting their positions to set said pins and bars in receptor tensioning position.

10. Apparatus according to claim 1, said panels each being a piece of polyvinyl chloride sheet material about 0.012 inch thick.

11. Apparatus for collecting solar heat comprising a substantially planar radiation receptor supported at an inclination across the path of sunlight, said receptor being composed essentially of front and back panels of strong flexible plastic sheet material and means interconnecting and sealing together said panels entirely about their peripheries and also along laterally spaced regions thereof so as to form said panels into and define between them a shallow fluid-tight chamber subdivided into channels of limited width communicating with plenum spaces in the upper and lower ends of the chamber, an inlet to the lower plenum space for liquid flow into said chamber, an outlet from the upper plenum space for outflow of heated liquid, conduit means for conducting liquid in a circuit from said outlet to a heat exchange zone and thence back into said inlet, means for keeping said chamber and said conduit means completely filled with liquid and holding the liquid in said chamber constantly under a substantially uniform limited hydraulic pressure insufficient to rupture said receptor, and means engaged with edge portions of said panels along the opposite side edges of said chamber for holding said receptor under cross tension counteracting the hydraulic pressure in said chamber so as to limit bulging of said channels and said plenum spaces.

* * * * *